US009069506B2

(12) United States Patent
Kato

(10) Patent No.: US 9,069,506 B2
(45) Date of Patent: Jun. 30, 2015

(54) SYSTEMS AND METHODS FOR REALLOCATING IMAGE PROCESSING DEVICES

(71) Applicants: Canon Information and Imaging Solutions, Inc., Melville, NY (US); Canon U.S.A., Inc., Melville, NY (US)

(72) Inventor: Hisashi Kato, Plainview, NY (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 195 days.

(21) Appl. No.: 13/871,964

(22) Filed: Apr. 26, 2013

(65) Prior Publication Data

US 2014/0320891 A1    Oct. 30, 2014

(51) Int. Cl.
    *G06F 3/12*    (2006.01)
(52) U.S. Cl.
    CPC ....................................... *G06F 3/126* (2013.01)
(58) Field of Classification Search
    None
    See application file for complete search history.

(56) References Cited

U.S. PATENT DOCUMENTS

| 6,606,162 | B1 * | 8/2003 | Simpson ...................... 358/1.15 |
| 7,081,969 | B1 * | 7/2006 | Motamed et al. ............ 358/1.15 |
| 7,102,775 | B2 * | 9/2006 | Suyehira ...................... 358/1.15 |
| 7,957,019 | B2 | 6/2011 | Swift et al. |
| 8,180,665 | B2 | 5/2012 | Handley et al. |
| 2003/0030842 | A1 * | 2/2003 | Suyehira ...................... 358/1.15 |
| 2003/0172086 | A1 * | 9/2003 | Parry .......................... 707/104.1 |
| 2004/0227973 | A1 * | 11/2004 | Taylor .......................... 358/1.15 |
| 2004/0239992 | A1 * | 12/2004 | Kawai et al. ................ 358/1.15 |
| 2011/0029346 | A1 * | 2/2011 | Kong ................................ 705/8 |

FOREIGN PATENT DOCUMENTS

| JP | 2006260447 A | 9/2006 |
| JP | 2009193178 A | 8/2009 |

OTHER PUBLICATIONS

Identify and Control Printing Costs, Axess Managed Print Services, Nov. 22, 2009.
HP Web Jetadmin Solution and Feature Guide, http://h20331.www2.hp.com/hpsub/downloads/WJA%20Solutions%20and%20Feature%20Guide.pdf, Sep. 2010.
Managed Print Service, Charleston Imaging Products, http://www.charlestonimaging.com/Managed_Print_Service.html, 2012.

* cited by examiner

*Primary Examiner* — Nicholas Pachol
(74) *Attorney, Agent, or Firm* — Canon U.S.A., Inc., IP Division

(57) ABSTRACT

Systems and methods for reallocating image processing devices receive usage data of each of a plurality of distributed devices, determine respective current usage rates of each of the distributed devices based on the usage data, calculate respective anticipated print counts of each of the distributed devices expected at a first predetermined time from the current usage rates, determine that one of the distributed devices is a high-usage device based at least on the anticipated print counts, determine at least one high-usage device and at least one low-usage device to reallocate so that the anticipated print count of the each of the distributed devices stays within a predetermined range of a target print count, and indicate the at least one high-usage device and the at least one low-usage device to reallocate.

11 Claims, 12 Drawing Sheets

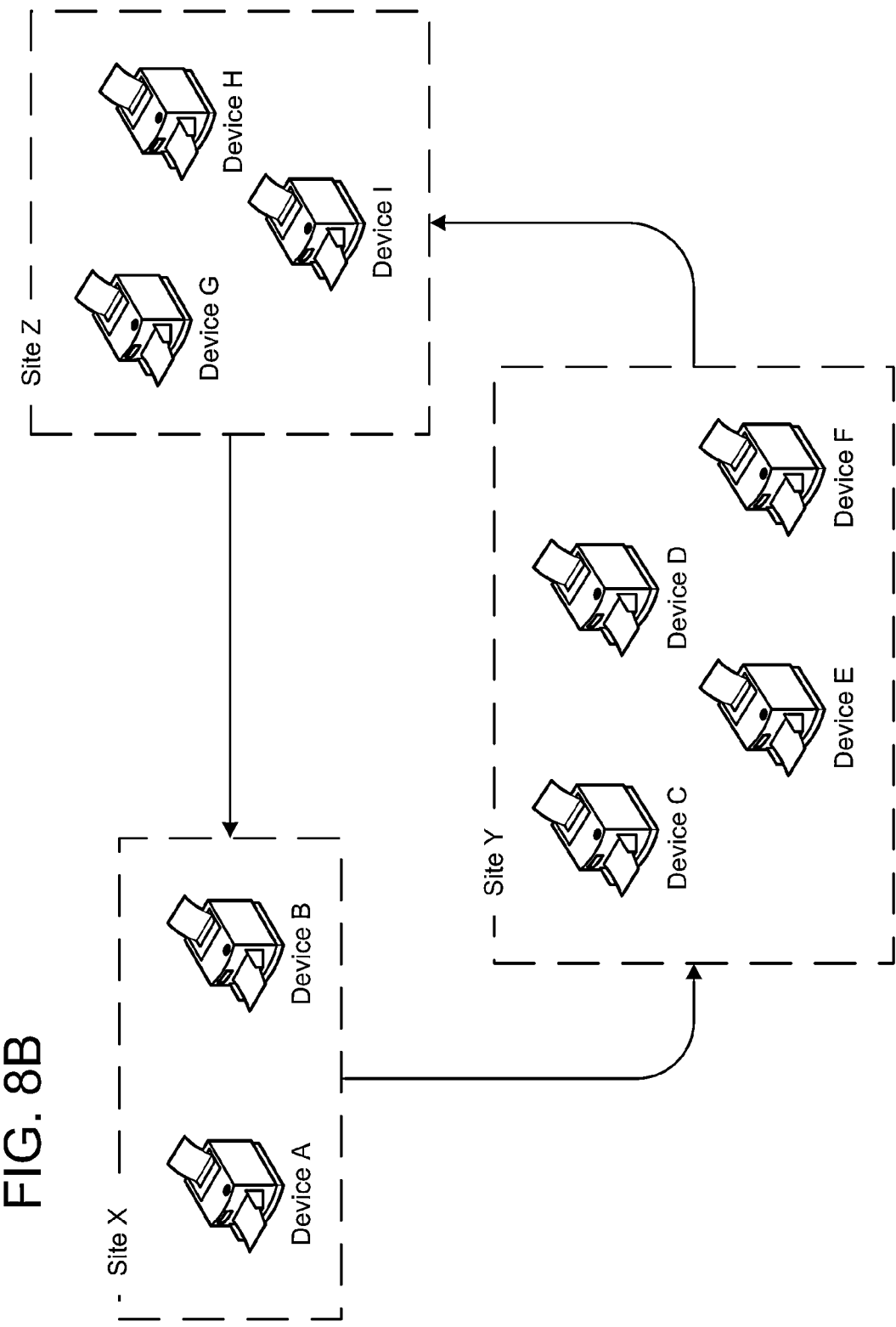

FIG. 9

Device List

| Device Name | Print Count (Current) | Print Count/Day | Expected Print Count | Area |
|---|---|---|---|---|
| ☑ Device A | 850000 | 1500 | 1800000 | X |
| ☐ Device D | 600000 | 1200 | 1200000 | Y |
| ☐ Device G | 240000 | 800 | 500000 | Z |
| ☐ Device B | 120000 | 400 | 250000 | X |
| ☐ Device I | 660000 | 1300 | 1300000 | Z |

☐ Consider the distance
Less than: 100
● Miles
○ Transportation Cost (Dollars)

[Search Candidate devices to be switched]　[Cancel]

FIG. 10

Candidate devices

Device A

| Device Name | Print Count (Current) | Print Count/Day | Expected Print Count | Area |
|---|---|---|---|---|
| Device A | 850000 | 1500 | 1800000 | X |

Candidate Devices to be switched with Device A

| Device Name | Cost reduction (Estimate) | Distance | Transport Fee | |
|---|---|---|---|---|
| Device H | $3,000 | 300 miles | $400 | Details |
| Device E | $1,800 | 20 miles | $150 | Details |

SYSTEMS AND METHODS FOR REALLOCATING IMAGE PROCESSING DEVICES

BACKGROUND

1. Field of the Disclosure

The present disclosure relates generally to systems and methods for reallocating image processing devices.

2. Description of the Related Art

For businesses, the running costs of office equipment can be financially burdensome. This is especially true for office equipment, such as printers, scanners, photocopiers, and MFPs, that has a higher running cost at least partially due to its need for many consumable parts and periodical maintenance to maintain optimal performance of the device. Therefore, businesses desire to minimize the running cost of their office equipment while maintaining the optimal performance of the equipment.

SUMMARY

In one embodiment, a method for managing distributed devices comprises receiving usage data of each of a plurality of distributed devices; determining, based on the usage data, respective current usage rates of each of the distributed devices; calculating, from the current usage rates, respective anticipated print counts of each of the distributed devices expected at a first predetermined time; determining, based at least on the anticipated print counts, that one of the distributed devices is a high-usage device; determining at least one high-usage device and at least one low-usage device to reallocate so that the anticipated print count of the each of the distributed devices stays within a predetermined range of a target print count; and indicating the at least one high-usage device and the at least one low-usage device to reallocate.

BRIEF DESCRIPTION OF THE DRAWINGS

FIGS. 8A and 8B illustrate embodiments of arrangements of device reallocations.

FIG. 9 illustrates an example embodiment of a user interface.

FIG. 10 illustrates an example embodiment of a user interface.

DETAILED DESCRIPTION

The following description is of certain illustrative embodiments, although other embodiments may include alternatives, equivalents, and modifications. Additionally, the illustrative embodiments may include several novel features, and a particular feature may not be essential to practice the devices, systems, and methods described herein.

Figure 1:
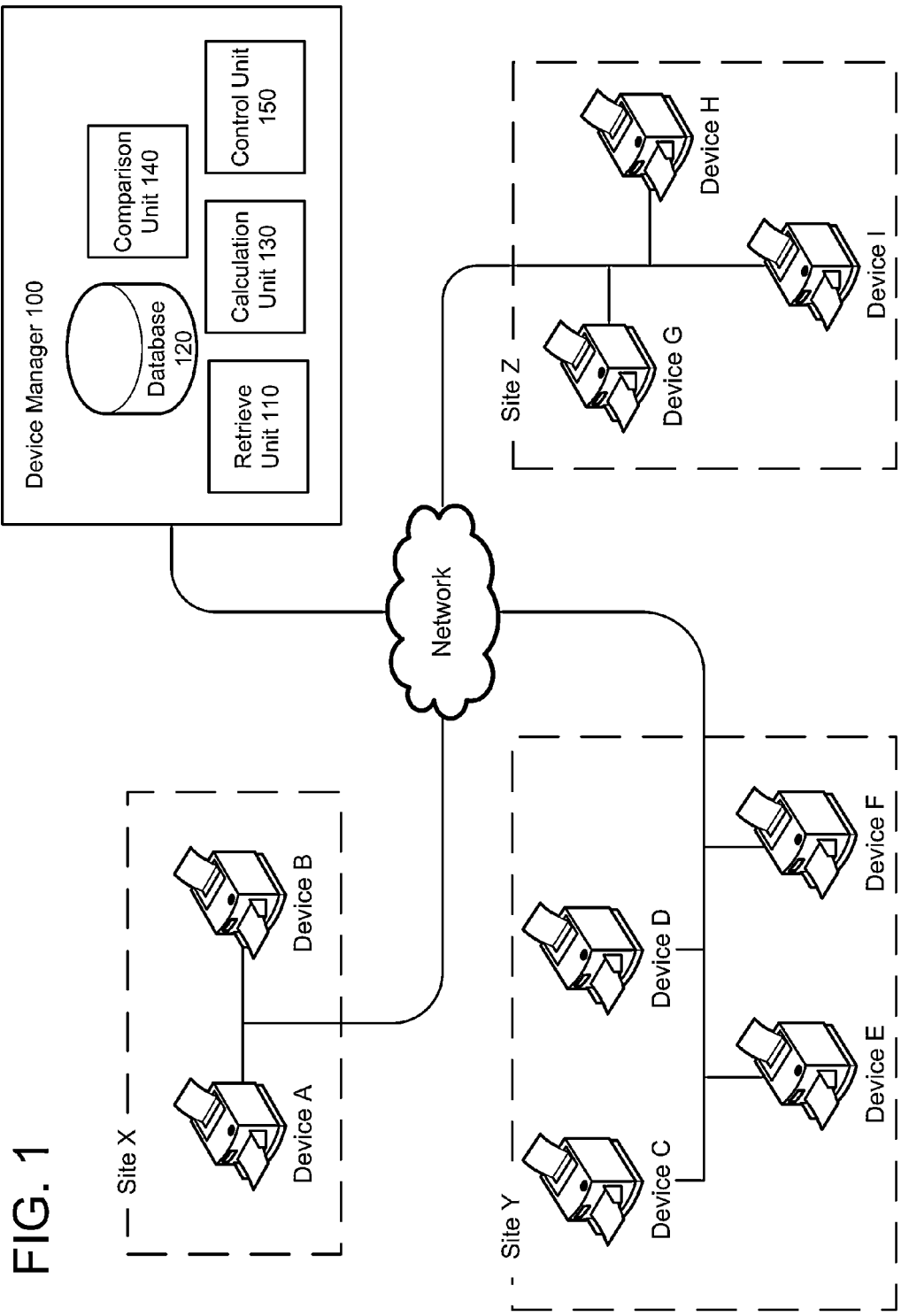
FIG. 1 is a block diagram illustrating an embodiment of a device management system.

FIG. 1 is a block diagram illustrating an embodiment of a device management system. The device management system includes distributed devices A-I and a device manager 100. Each of the distributed devices A-I is connected to the device manager 100 via a network. The network may include a wide area network (WAN), a local area network (LAN), the Internet, and any combination of the aforementioned networks. Further, the entities in the device management system may communicate via wired or wireless channels that allow the exchange of data between the entities.

The devices A-I may be image processing devices, such as printers, scanners, multi-function printers, copiers, and facsimile devices, and have network interfaces. The network interfaces allow the devices A-I to communicate with the other devices via a network. The devices A-I may be provided in various distributed locations. For example, the devices A and B are provided at site X, the devices C-F are located at site Y, and the devices G-I are located at site Z. Further, sites X, Y, and Z may be geographically distant from each other, for example site X may be in California, site Y may be in Illinois, and site Z may be in Florida. In some embodiments, sites X, Y, and Z are geographically close to each other, for example different floors of the same building.

The device manager 100 may be any computing device, such as a desktop, a laptop computer, a server, a mobile phone, a personal digital assistant (PDA), or a tablet, that is capable of communicating via a network and may include at least one display that is capable of rendering images. The device manager 100 includes one or more processors (also referred to herein as "CPUs"), which may be conventional or customized microprocessors or other circuits. The CPUs are configured to read and execute computer-readable instructions, and the CPUs may command or control other components of the device manager 100.

The device manager 100 also includes I/O interfaces or I/O devices. The I/O interfaces provide communication interfaces to I/O devices, and the I/O devices may include a keyboard, a display device, a mouse, a printing device, a touch screen, a light pen, an optical storage device, a scanner, a microphone, a camera, etc. The device manager 100 also includes memory, which may be volatile or non-volatile, such as ROM, RAM, and flash memory. The device manager 100 further includes a network interface that allows the device manager to communicate with the other devices. The device manager 100 also includes a storage device that is configured to store data or modules and may include, for example, a hard drive, an optical storage device, a diskette, or a solid state drive. The device manager 100 includes an operating system, which manages the hardware, the processes, the interrupts, the memory, or the file system of the device manager 100. The device manager 100 further includes a retrieve unit 110, a database 120, a calculation unit 130, a comparison unit 140, and a control unit 150.

The retrieve unit 110 is configured to receive device information from each of the devices A-I via the network. The device information may include usage data of respective devices A-I, such as the current print count of the device. Further, the device information may include device-properties data of the respective devices A-I, such as device name, location, installation date, and expiration date of the device.

The database 120 is configured to store the received device information of each of the devices A-I. The database 120 is further configured to store parts information of the distributed devices A-I. The parts information may include durability information of the parts used in the devices A-I and the price information of the parts. Further, the labor fee involved in replacing the parts may be included in the parts information. The information (e.g., the device information or the parts information) stored in the database 120 may be accessed by other components of the device manager 100.

The calculation unit 130 is configured to perform calculations. For example, the calculation unit 130 calculates a usage rate and an anticipated print count of each of the devices A-I from the device information.

The comparison unit 140 is configured to compare the anticipated print count to a predetermined target print count. The target print count may be determined by a contract. Further, the target print count may be included in the device information and stored in the database 120. In some embodiments, the target print count may be received via the I/O interfaces of the device manager 100. The comparison unit 140 is further configured to determine a high-usage device and a low-usage device according to the result of the comparison. For example, if the result suggests that the anticipated print count of a distributed device exceeds the target print count, the comparison unit 140 determines that the distributed device is a high-usage device. On the other hand, if the result of the comparison suggests that the anticipated print count of a distributed device will not reach the target print count, the comparison unit 140 determines that the distributed device is a low-usage device.

The control unit 150 is configured to provide instructions to the components of the device manager 100. For example, the control unit 150 sends instructions to generate a user interface to present information to the user.

Figure 2:
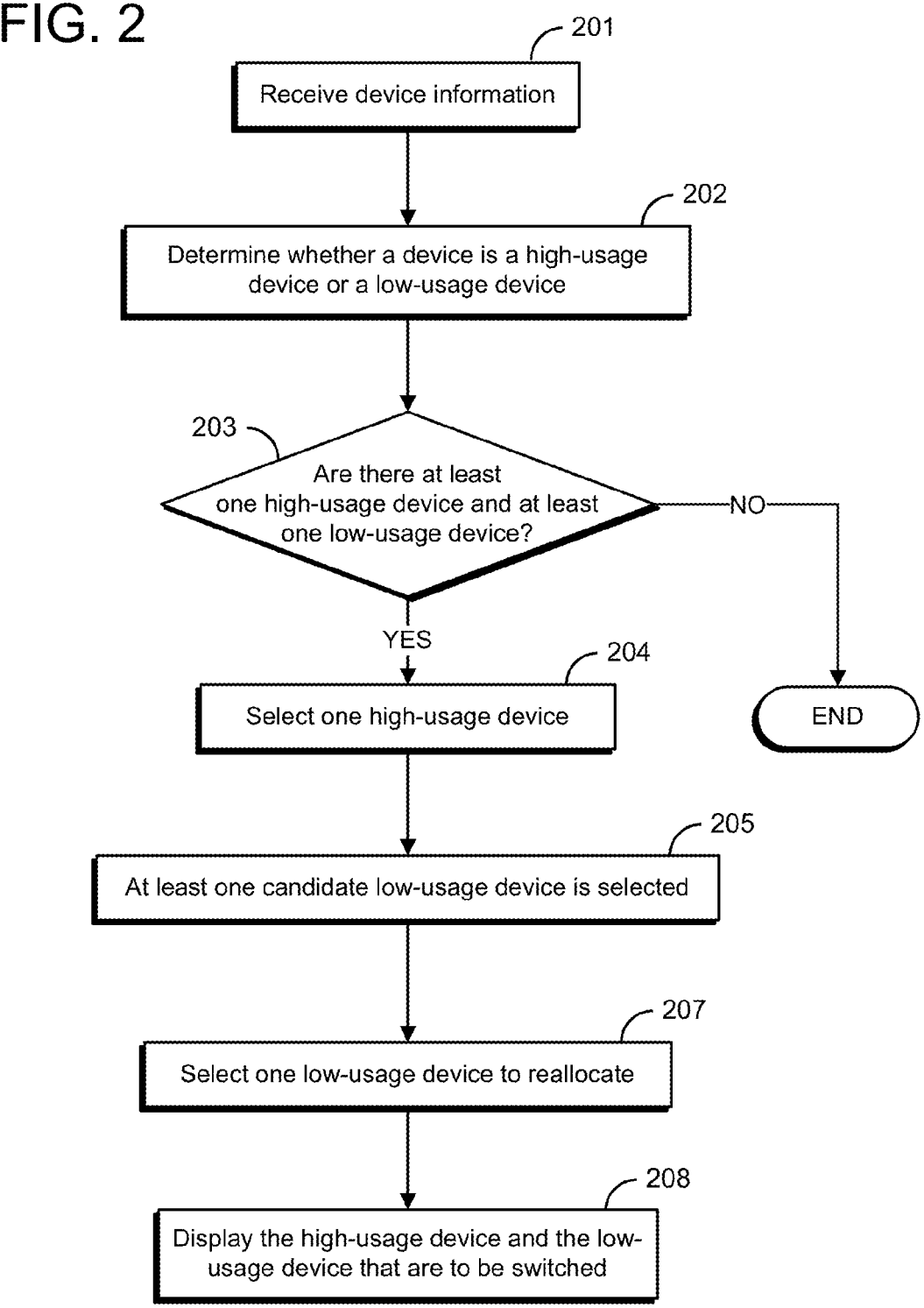
FIG. 2 is a flowchart illustrating an embodiment of a method for managing distributed devices.

FIG. 2 is a flowchart illustrating an embodiment of a method for managing distributed devices. Beginning in block 201, a retrieve unit (e.g., the retrieve unit 110) receives device information from distributed devices (e.g., devices A-I). Then the retrieve unit sends the device information to a database (e.g., the database 120) for storing the device information. In block 202, whether a device of the distributed devices (e.g., one of the devices A-I) is a high-usage device or a low-usage device is determined based on the received device information. In block 203, whether there are at least one high-usage device and at least one low-usage device is determined. If there are at least one high-usage device and at least one low-usage device (block 203=YES), then the flow proceeds to block 204. Otherwise, if there are not at least one high-usage device and at least one low-usage device (block 203=NO), the flow ends. In block 204, one high-usage device is selected from the devices that are high-usage devices. In block 205, at least one candidate low-usage device to be switched with the selected high-usage device is selected. In block 206, one low-usage device to be reallocated is selected from the candidate low-usage devices. In block 207, the high-usage device and the low-usage device that are to be switched with each other are displayed on a display (e.g., sent via the I/O interfaces of the device manager 100).

Figure 3:
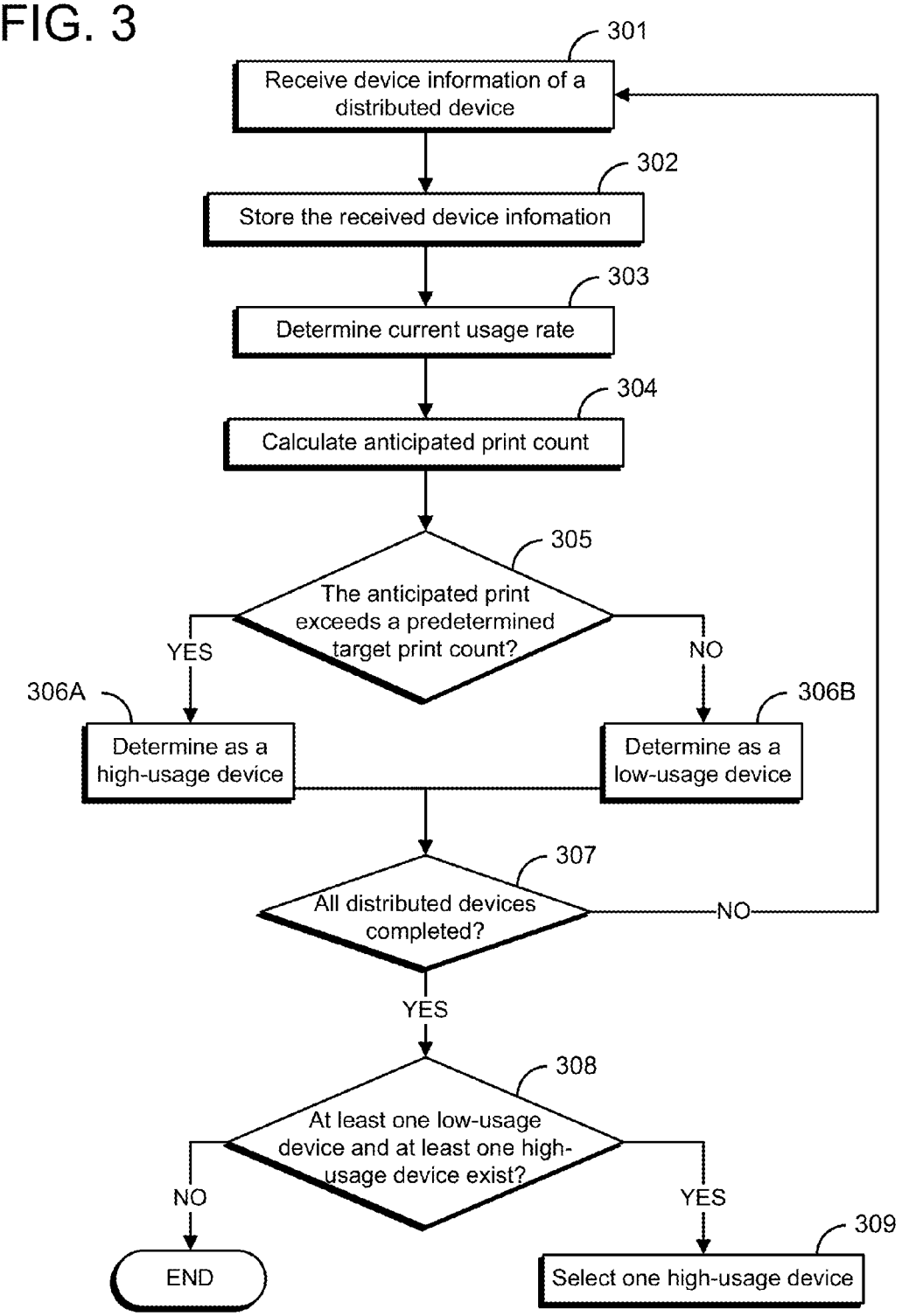
FIG. 3 is a flowchart illustrating an embodiment of a method for selecting a device to reallocate.

FIG. 3 is a flowchart illustrating an embodiment of a method for selecting a device to reallocate. Beginning in block 301, device information of a distributed device (e.g., one of the distributed devices A-I) is received at a device manager (e.g., the retrieve unit 110 of the device manager 100) via a network. In some embodiments, the device information is sent in response to a request from the device manager. Also, in some embodiments, the device information is periodically (e.g., once a day) sent to the device manager. The device information includes the current print count and the installation date of the distributed device. The current print count is the total print count output by the distributed device in a period of time. For example, the current print count may be the total print count of the distributed device from the time when the device was installed at the site until the time when the current print count was sent to the device manager. In some embodiments, the current print count is the total print count the distributed device output from the time when a new part was installed to the time when the current print count was received at the device manager. Further, the current print count may be the print count indicated on the print counter of the distributed device at the time of the inquiry.

In block 302, the received device information is stored in a database (e.g., the database 120). In block 303, a current usage rate is determined. The current usage rate is a print count over a period of time (e.g., per day). The following formula may be used to determine the current usage rate:

(Current usage rate)=(Current print count)/(Number of days (e.g., since installation, since a part was replaced)).

The number of days since installation may be calculated from the installation date stored in the database. Further, the current usage rate is determined by dividing the current print count of the distributed device by the number of days elapsed since the distributed device was installed at the site.

For example, if the current print count of the device is 430,000 and the number of days since the device was installed is 250, then 430,000 is divided by 250. Thus the current usage rate of the device is determined to be 1,720.

Next, in block 304, an anticipated print count is calculated. The anticipated print count is an expected print count after a certain time. In the illustrated embodiment, the certain time is the day when the contract will be terminated. In some embodiments, a certain time is arbitrarily selected. The anticipated print count is calculated by multiplying the current usage rate by the number of days left until the certain time elapses and adding the current print count to the multiplication result. For example, if the current usage rate is determined to be 380 per day, the number of days until the contracts matures is 650 days, and the current print count is 117,000 then the anticipated print count is determined to be 364,000.

In block 305, whether the anticipated print exceeds a predetermined target print count is determined. In the illustrated embodiment, the predetermined target print count is the print count agreed in the contract. Also, the predetermined target print count may be an average print count of the distributed devices after an arbitrarily selected period of time (e.g., after three months). In some embodiments, the predetermined target print count is determined by considering the respective current usage rates and the durability of parts of the distributed devices. The anticipated print count of the distributed device is compared to the predetermined target print count of the distributed device. If the anticipated print count exceeds the predetermined target print count (block 305=YES), then the flow proceeds to block 306A and the distributed device is determined to be a high-usage device in block 306A. Otherwise, if the anticipated print count does not exceed the predetermined target print count (block 305=NO), the flow proceeds to block 306B and the distributed device is determined to be a low-usage device in block 306B.

In block 307, whether the determination of high-usage device and low-usage device was performed for all of the distributed device is determined. If the determination was performed for all of the distributed devices (block 307=YES), the flow proceeds to block 308. If the determination has not been performed to all of the distributed devices (block 307=NO), then the flow returns to block 301 until the determination is performed for all of the distributed devices.

In block 308, whether there exists at least one high-usage device and at least one low-usage device is determined. If there is at least one high-usage device and if there is at least one low-usage device (block 308=YES), then the flow proceeds to block 309. Otherwise, if either of the high-usage device or the low-usage device does not exist (block 308=NO), the flow ends. For example, if there is one high-usage device, but there is no low-usage device, then the flow ends.

In block 309, one high-usage device is selected. If there are a multiple high-usage devices, then the high-usage device having the highest anticipated print count may be selected. In some embodiments, a list of a plurality of the high-usage devices is displayed, and the device manager receives a user selection of a high-usage device via the I/O interfaces of the device manager.

In block 309, the difference between the anticipated print count and the predetermined target print count of the selected high-usage device is determined.

Figure 4:
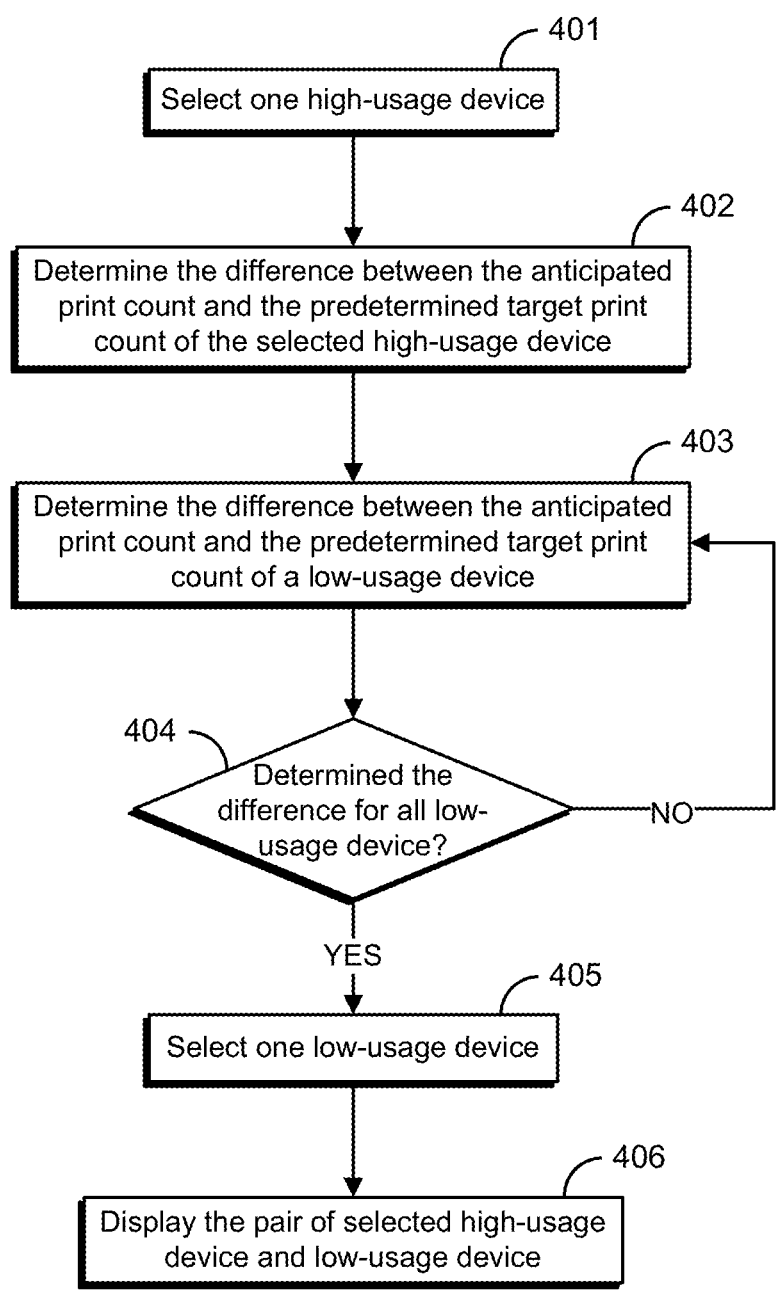
FIG. 4 is a flowchart illustrating an embodiment of selecting a low-usage device to reallocate.

FIG. 4 is flowchart illustrating an embodiment of selecting a low-usage device to reallocate. When a high-usage device is selected, a low-usage device needs to be selected to level the print counts over the entire set of distributed devices. Beginning in block 401, one high-usage device selected. The high-usage device may be selected according to the method described in FIG. 3.

In block 402, the difference between the anticipated print count and the predetermined target print count of the selected high-usage device is determined. In block 403, the difference between the anticipated print count and the predetermined target print count of a low-usage device is determined. In block 404, whether the difference between the anticipated print count and the predetermined target print count has been determined for each of the low-usage devices is determined. If the difference has been determined for all of the low-usage devices (block 404=YES), the flow proceeds to block 405. If the difference has not been determined for all of the low-usage devices (block 404=NO), then the flow returns to block 403.

In block 405, one low-usage device to be reallocated is selected. If there is a plurality of low-usage devices, a low-usage device having a similar absolute difference from the target print count as the selected high-usage device may be selected. In some embodiments, a user selects one low-usage device from a list of the plurality of the low-usage devices displayed via the I/O interfaces of the device manager. In block 406, the selected high-usage device and the selected low-usage device are displayed via the I/O interfaces of the device manager as a pair of distributed devices to be reallocated to level the usages and the print counts of the entire set of distributed devices.

Figure 5:
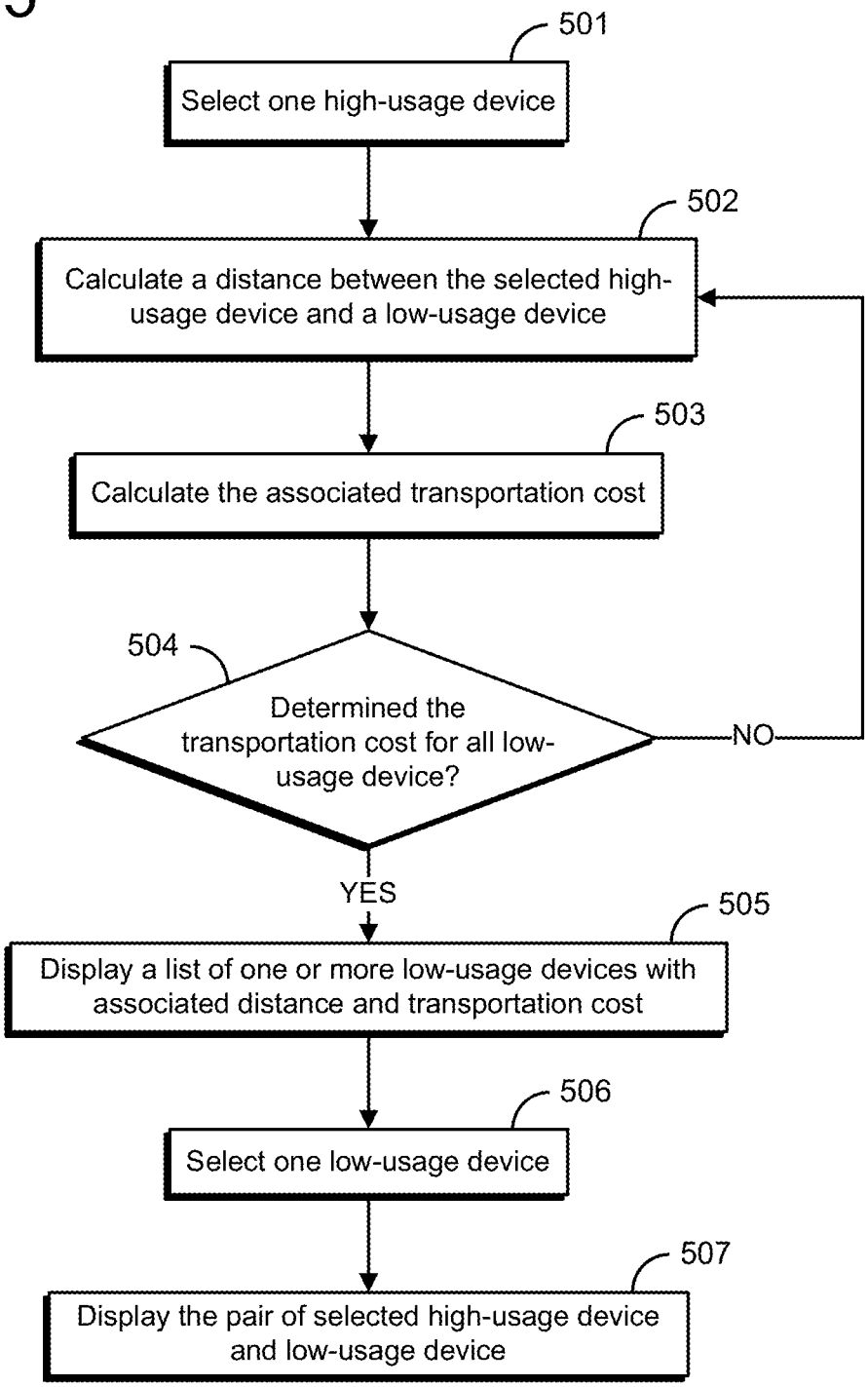
FIG. 5 is a flowchart illustrating an embodiment of selecting a low usage device to reallocate.

FIG. 5 is a flowchart illustrating an embodiment of selecting a low-usage device to reallocate. Beginning in block 501, one high-usage device is selected according to FIG. 3. In block 502, a distance between the selected high-usage device and a low-usage device is calculated. The location information stored in the database may be used to calculate the distance between the respective locations of the selected high-usage device and the low-usage device.

In block 503, a transportation cost associated with reallocating the selected high-usage device and low-usage device is calculated. The transportation cost may include the labor fee, gas cost, freight cost, and other transportation fees (e.g., fee of toll roads) required to switch the selected high-usage device and the low-usage device. Also, the transportation cost may include non-monetary measures, for example transportation time or distance. In block 504, whether the transportation cost of each of the low-usage devices is determined is verified. If the associated transportation cost is determined for all of the low-usage devices (block 504=YES), the flow proceeds to block 505. If the associated transportation cost is not determined for all of the low-usage devices (block 504=NO), the flow returns to block 502 and the flow is repeated until the associated transportation cost for all of the low-usage devices has been calculated.

In block 505, a list that includes one or more low-usage devices with their corresponding distance and associated transportation cost is displayed on the I/O interfaces of the device manager. However, block 505 may be omitted if the device manager is arranged to select the low-usage device to be reallocated. In such a case, the device manager may select a low-usage device which has the least distance or the least transportation cost. Further, a low-usage device located more than a predetermined distance away from the selected high-usage device may be omitted from the list. The predetermined distance may be set by user selection or a predetermined formula, for example. In block 506, one low-usage device is selected from the list. In block 507, the pair, which includes the high-usage device and the low-usage device to be reallocated, is displayed on the display by the device manager.

Figure 6:
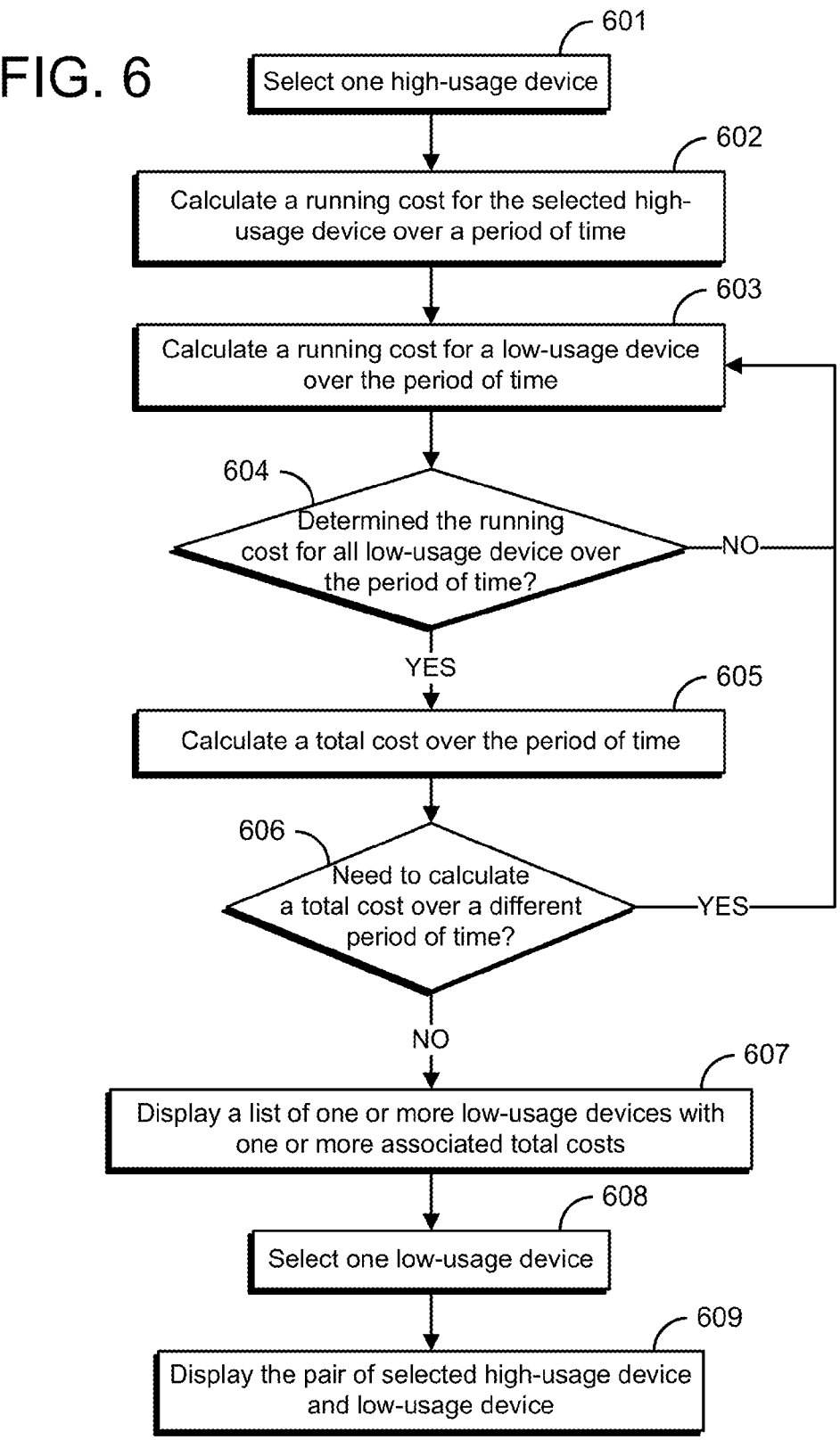
FIG. 6 is a flowchart illustrating an embodiment of selecting a low-usage device to reallocate.

FIG. 6 is a flowchart illustrating an embodiment of selecting a low-usage device to reallocate. In block 601, one high-usage device is selected according to FIG. 3. In block 602, a running cost for the selected high-usage device over a predetermined period of time is calculated. The running cost includes a cost of parts and a labor fee associated with replacing the parts and with maintaining the selected high-usage device at the current usage rate over the predetermined period of time. The predetermined period of time may be the period of time until the termination of the contract or an arbitrarily selected date or time. The cost of parts is calculated by considering the durability of the parts, determining the number of times the parts will be replaced within the predetermined period of time at the current usage rate, and multiplying the number of times that the parts will be replaced and the actual cost of the parts. The labor fee may result from the actual action of replacing the parts, including the traveling cost for a technician to travel to the location of the distributed device.

In block 603, a running cost for a low-usage device over the predetermined period of time is calculated. In block 604, whether respective running costs for all of the low-usage devices over the predetermined period of time have been calculated is determined. If the calculations of the respective running cost for all of the low-usage devices has been completed (block 604=YES), the flow proceeds to block 605. If the calculation of the respective running costs for all of the low-usage devices have not been completed (block 604=NO), then the flow returns to block 603.

In block 605, a total cost over the predetermined period of time is calculated. The total cost may be the sum of the running costs of the selected high-usage device and the low-usage device. The total cost may be calculated for the selected high-usage device and the low-usage device. In block 606, whether a total cost over a different period of time needs to be calculated is determined. In some embodiments, the total cost over a different period of time may be calculated to illustrate the most cost-effective time to perform reallocations. If the total cost over a different period of time is needed (block 606=YES), the flow returns to block 603 with the different predetermined period of time. If the total cost over a different period of time is not needed (block 606=NO), the flow proceeds to block 607.

In block 607, a list that includes one or more low-usage devices with the corresponding running costs and total costs is sent to a display via the I/O interfaces of the device manager. In block 608, one low-usage device is selected from the list. However, block 607 and 608 may be omitted, for example if the device manager is arranged to select the low-usage device to be reallocated. In such a case, the device manager may select a low-usage device that has the least running cost or the least total cost. In block 609, the pair of the high-usage device and the low-usage device to be reallocated is displayed on a display by the device manager (e.g., by the device manager sending a user interface to a display device).

Figure 7A:
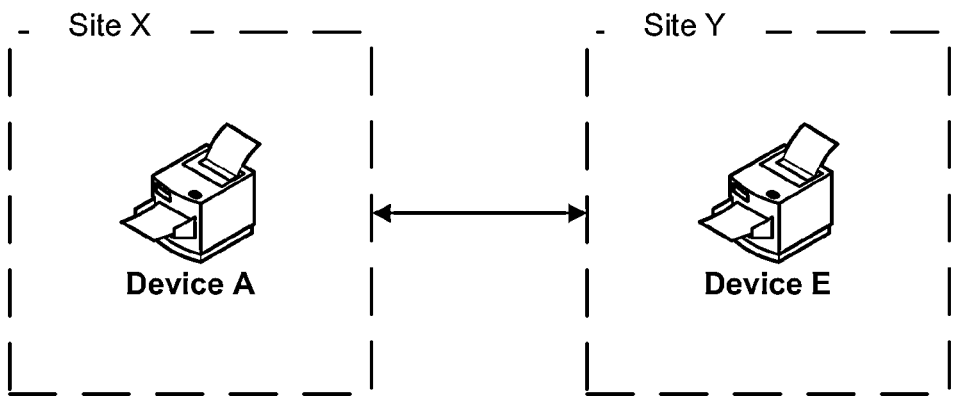
FIGS. 7A and 7B illustrate embodiments of arrangements of device reallocations.
Figure 7B:
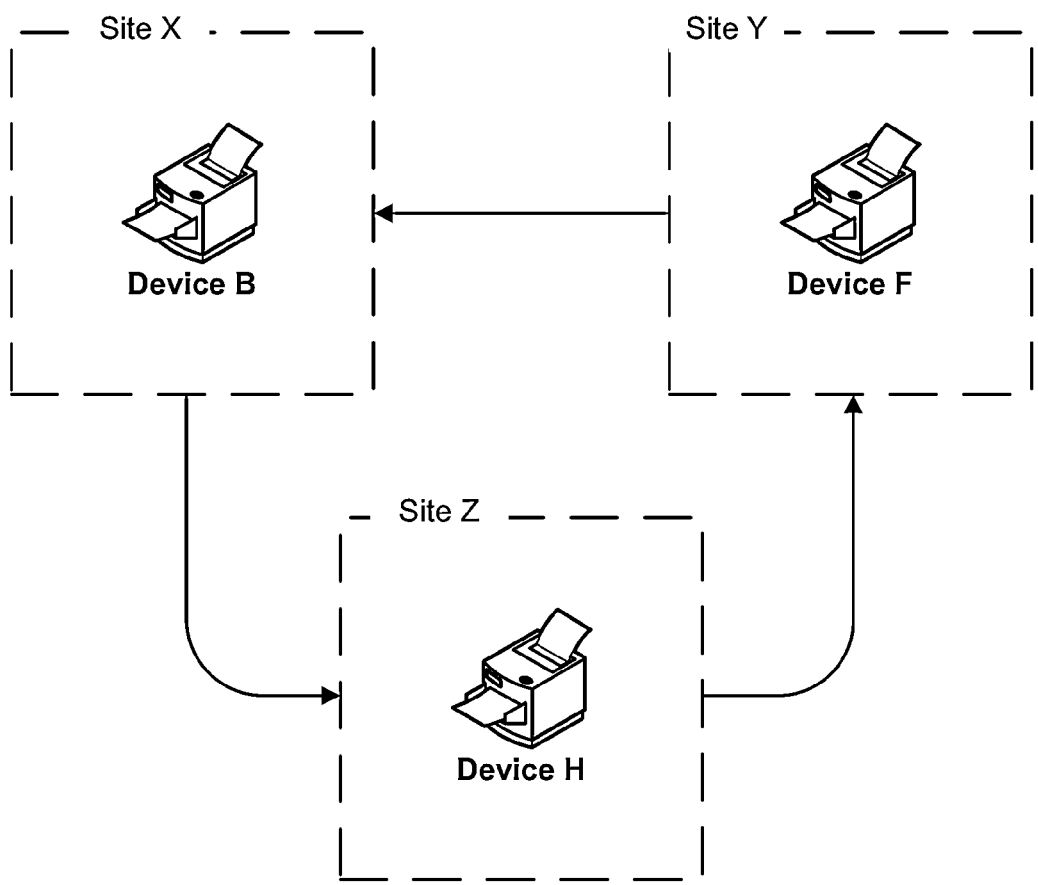

FIGS. 7A and 7B illustrate embodiments of arrangements of device reallocations. FIG. 7A illustrates an embodiment of an arrangement of device reallocations where two of devices are selected to be reallocated. The two selected devices includes one high-usage device (e.g., the distributed device A of the site X), which may be selected according to FIG. 3, and one low-usage device (e.g., the distributed device E of the site Y), which may be selected according to FIGS. 4-6. In the illustrated embodiment, the distributed device A of site X, which is a high-usage device, is indicated to be switched with the distributed device E of the site Y. Thus, the distributed device A and the distributed device E are switched so that the distributed device A will be reallocated to the original location of the distributed device E, and the distributed device E will be reallocated to the original location of the distributed device A.

FIG. 7B illustrates an embodiment of an arrangement of device reallocations where three devices are selected for reallocation by the device manager. The three devices may have any combination of high-usage devices and low-usage devices as long as at least one high-usage device and at least one low-usage device are included in the three selected devices. Additionally, the combination of the selected high-usage and low-usage devices for the three devices is arranged to level the usage (e.g., the print count) of the distributed devices. In the illustrated embodiment, three distributed devices are selected from the distributed devices A-I of the printing system of FIG. 1. The three selected distributed devices are the distributed device B of site X, which is a high-usage device, and the distributed device F of site Y and the distributed device H of site Z, which are low-usage devices. If the distributed device B is reallocated to the original location of the distributed device F, if the distributed device F is reallocated to the original location of the distributed device H, and if the distributed device H is reallocated to the original location of the distributed device B, then the respective print counts of the distributed devices A-I of the printing system will be within a predetermined target print count. The three-way (or other multiple of greater than three) device exchange may take advantage of lower transportation costs between certain sites, of time constraints for transportation or production that require the devices, and of greater flexibility in device arrangements that can meet target print counts and target costs.

Figure 8A:
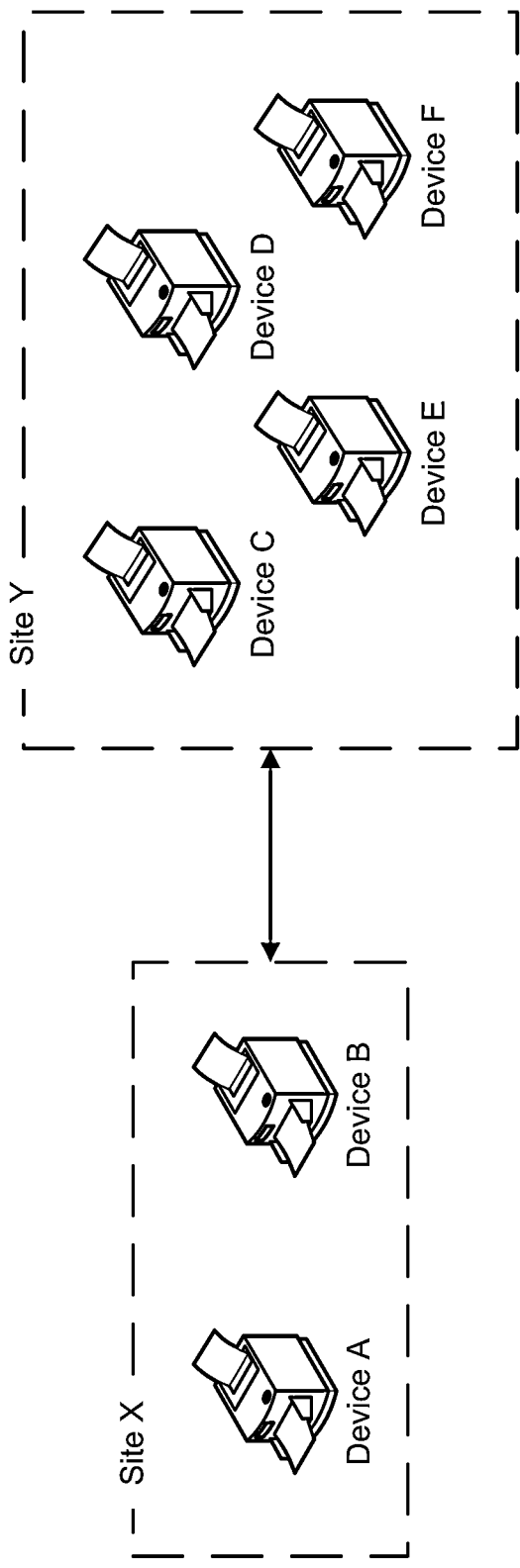

FIGS. 8A and 8B illustrate embodiments of arrangements of device reallocations. FIG. 8A illustrates an embodiment of an arrangement of device reallocations where two sets of devices are selected to be reallocated. A set of devices may include any combination of high-usage devices and low-usage devices. In some embodiments, A set of devices may include equal numbers of high-usage devices and low-usage devices. Also, in some embodiments, all of the devices included in the set of devices may be high-usage devices or low-usage devices. In the illustrated embodiment, the first selected set of devices includes two high-usage devices (e.g., the devices A and B of site X). The second set of devices includes one high-usage device and three low-usage devices (e.g., the device D, the high-usage device, and the devices C, E, and F, the low-usage devices, of site Y).

In some embodiments, the devices located within a certain distance of each other may be grouped together as a set and considered as a whole. For example, the devices A and B are both located at site X and considered as a set, thus, parts of the device information (e.g., the current print count, predetermined target print count, current usage rate, anticipated print count) of the devices A and B are combined. For instance, if the current print count of the device A is 850,000 and the current print count of the device B is 120,000, then the current print count of the devices A and B when considered as a whole will be 970,000.

The process (e.g., FIGS. 2-6) of determining at least two devices (e.g., one high-usage device and one low-usage device) to reallocate is performed to a set of devices instead of individual devices. In the illustrated embodiment of FIG. 8A, the set of distributed devices (e.g., the devices A and B) at site X is selected as a high-usage set according to FIG. 3. The set of distributed devices (e.g., the devices C-F) at site Y is selected as a low-usage set to be switched with the high-usage set, which includes the devices A and B of site X. Thus, the set of distributed devices at site X and the set of distributed devices at site Y are switched so that the set of distributed devices at site X will be reallocated to site Y and the set of distributed devices at site Y will be reallocated to site X.

FIG. 8B illustrates an embodiment of an arrangement of device reallocations where three sets of devices are selected to be reallocated. A set of devices may include any combinations of high-usage devices and low-usage devices. In some embodiments, A set of devices may include equal numbers of high-usage devices and low-usage devices. Also, in some embodiments, all of the devices included in the set of devices may be high-usage devices or low-usage devices. In the illustrated embodiment, the first selected set of devices includes two high-usage devices (e.g., the devices A and B of site X). The second set of devices includes one high-usage device and three low-usage devices (e.g., the device D, which is a high-usage device, and the devices C, E, and F, which are low-usage devices, of site Y). The third set of devices includes two high-usage devices and one low-usage device (e.g., the devices G and I, which are high-usage devices, and the device H, which is a low-usage device, of site Z).

In some embodiments, the devices located within a certain distance of each other may be grouped together as a set and considered as a whole. For example, the devices G, H, and I are located at site Z and are considered as a set. Thus, parts of the device information (e.g., the current print count, predetermined target print count, current usage rate, anticipated print count) of the devices G, H, and I are combined. For instance, the predetermined target print counts of the devices G, H, and I are as follows: 900,000 for the device G, 500,000 for the device H, and 630,000 for the device I. Thus, the predetermined target print count of the set of devices at site Z will be 2,030,000.

The process (e.g., FIGS. 2-6) of determining at least two devices (e.g., one high-usage device and one low-usage device) to reallocate is performed to a set of devices instead of individual devices. However, in some embodiments, the process may be performed to an individual device and the outcome of the process may be combined or averaged to determine high-usage sets and low-usage sets. In the illustrated embodiment, the set of distributed devices (e.g., the devices A and B) at site X is selected as a high-usage set according to FIG. 3. The set of distributed devices (e.g., the devices C-F) at site Y is selected as a low-usage set of a candidate to be switched with the other set of devices. The set of distributed devices (e.g., the devices G-I) at site Z is selected as a low-usage set of a candidate to be switched with the other set of devices. Thus, in order to level the print counts of the distributed devices, the set of distributed devices at site X will be reallocated to site Y, the set of distributed devices at site Y will be reallocated to site Z, and the set of distributed devices at site Y will be reallocated to site X.

FIG. 9 illustrates an embodiment of a user interface, which shows a list of high-usage devices. The distributed devices A and B of site X, the distributed device D of site Y, and the distributed devices G and I of site X are listed as high-usage devices. Additionally, the corresponding current print count, print count per day (e.g., the current usage rate), expected print count (e.g., anticipated print count), and area (e.g., site) of the high-usage devices are shown. A check box is provided next to each of the high-usage devices in the list so that a user may select a certain high-usage device. An option to select a limitation on the distance or the transportation cost is also shown. For example, a user may specify a distance, and low-usage devices within the specified distance of the high-usage device will be shown. A user may also specify a transportation cost, and the low-usage devices having a transportation cost equal to or less than the specified transportation cost will be shown. A button to execute the search of candidate low-usage devices to be switched is also provided. Further, a cancel button to cancel the process may also be provided in the user interface of a high-usage device list.

FIG. 10 illustrates an embodiment of a user interface, which shows a list of low-usage devices (e.g., candidate low-usage devices) to be reallocated. The high-usage device selected from the list of high-usage device is shown together with the corresponding current print count, current usage rate, anticipated print count, and site. A list of low-usage devices is also provided. The low-usage devices within a specified distance of the selected high-usage device or the low-usage devices having a transportation cost within a specified transportation-cost range may be shown in the list. In some embodiments, low-usage devices having a similar absolute difference between the anticipated print count and the predetermined target print count as that of the selected high-usage device are shown in the list. The corresponding distance, the transportation cost, and the overall cost reduction of the respective low-usage devices may be provided in the list. However, the corresponding distance, transportation cost and cost reduction are not required to be provided. Any combination of one or more of the corresponding distance, transportation cost, and cost reduction may be provided. The corresponding information may be arranged to be displayed upon request. A detail button may be provided for each of the low-usage devices in the list. When the user clicks on the detail button, a breakdown of transportation cost or cost reduction may be displayed.

Figure 11:
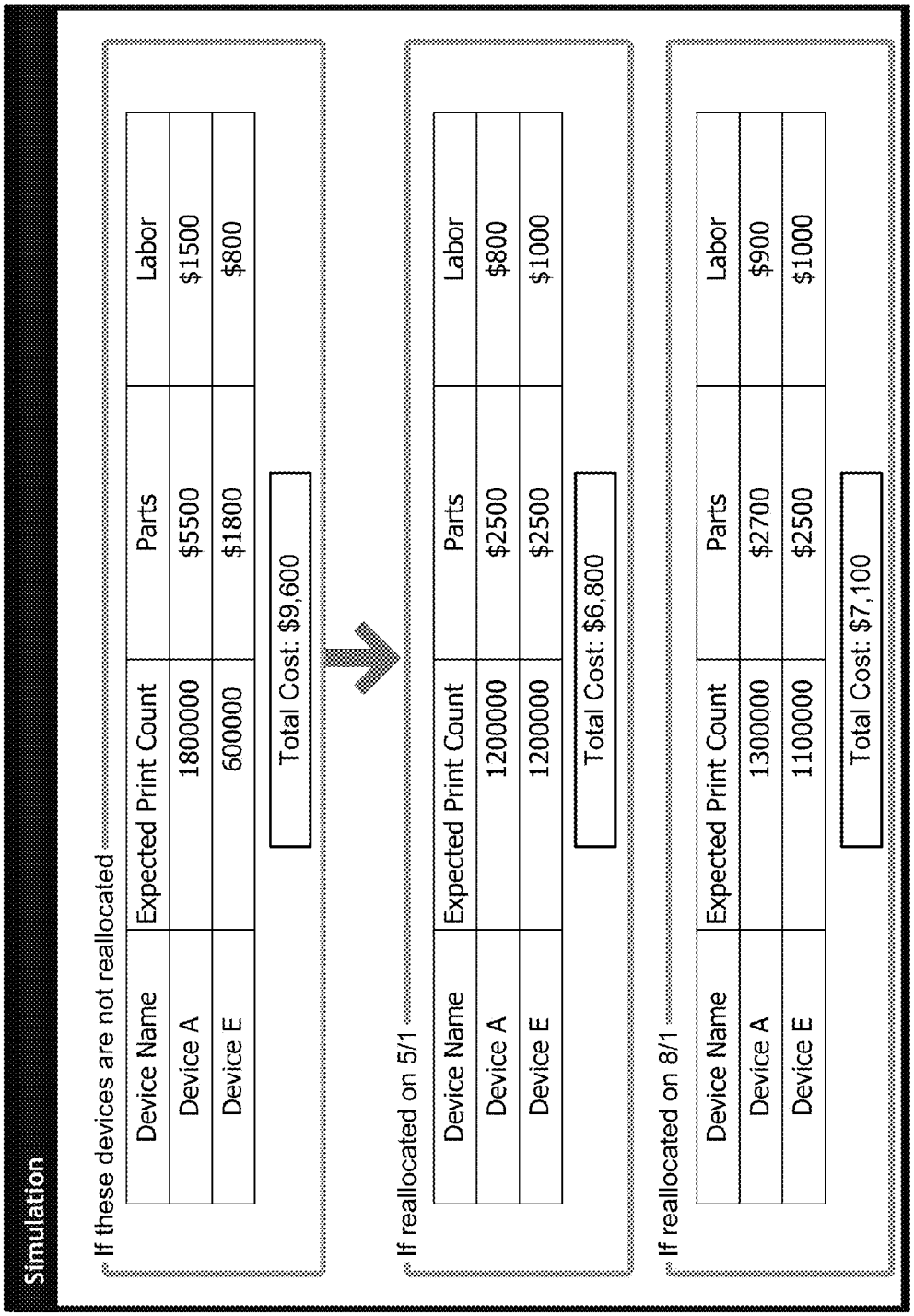
FIG. 11 illustrates an example embodiment of a user interface.

FIG. 11 illustrates an embodiment of a user interface. The user interface shows a simulated model of the corresponding anticipated print count and running cost for the pair of the selected high-usage device and the low-usage device. For example, when the selected distributed devices are not reallocated, the total cost is $9,600. However, if the distributed devices are reallocated on May 1, then the total cost will be $6,800. Further, if the distributed devices are reallocated on August 1, the total cost will be $7,100. Thus, the user may be able to determine the most cost-effective time to reallocate.

The above described devices, systems, and methods can be implemented by supplying one or more computer-readable media having stored thereon computer-executable instructions for realizing the above described operations to one or more computing devices that are configured to read the computer-executable instructions and execute them. In this case, the systems or devices perform the operations of the above-described embodiments when executing the computer-executable instructions. Also, an operating system on the one or more systems or devices may implement the operations of the above described embodiments. Thus, the computer-executable instructions or the one or more computer-readable media storing the computer-executable instructions thereon constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be written to a computer-readable medium provided on a function-extension board inserted into the device or on a function-extension unit connected to the device, and a CPU provided on the function-extension board or unit may implement the operations of the above-described embodiments.

While the above disclosure describes illustrative embodiments, it is to be understood that the invention is not limited to the above disclosure. To the contrary, the invention covers various modifications and equivalent arrangements within the spirit and scope of the appended claims. Also, as used herein, the conjunction "or" generally refers to an inclusive "or," though "or" may refer to an exclusive "or" if expressly indicated or if the context indicates that the "or" must be an exclusive "or."

What is claimed is:

1. A method for managing distributed devices, the method comprising:
   receiving usage data of each of a plurality of distributed devices, wherein the usage data include at least a total print count over a first period of time of the respective distributed device;
   determining, based on the usage data, respective current usage rates of each of the distributed devices;
   calculating, from the current usage rates, respective anticipated print counts of each of the distributed devices expected at a first predetermined time;
   determining, based at least on the anticipated print counts, that at least one of the distributed devices is a high-usage device;
   determining, based at least on the anticipated print counts, that at least one of the distributed devices is a low-usage device;
   calculating respective first differences between the anticipated print counts of each of the at least one of the distributed devices determined to be the high-usage device and a target print count;
   calculating respective second differences between the anticipated print counts of each of the at least one of the distributed devices determined to be the low-usage device and the target print count;
   determining, based on the calculated first differences and the calculated second differences, one or more pairs of the at least one of the distributed devices determined to be the high-usage device and the at least one of the distributed devices determined to be the low-usage device to relocate so that the anticipated print count of the each of the distributed devices stays within a predetermined range of a target print count; and indicating the one or more pairs to relocate.

2. The method according to claim 1, wherein the current usage rate is derived by dividing the total print count by the first period of time.

3. The method according to claim 1, wherein a high-usage device is a device whose anticipated print count exceeds the target print count and a low-usage device is a device whose anticipated print count is below the target print count.

4. The method according to claim 1, wherein usage data includes a respective location of a distributed device.

5. The method according to claim 4, wherein determining the one or more pairs to relocate includes
- calculating, based on the usage data, a distance from a first location where a first high-usage device is located to a second location to where the first high-usage device is reallocated is calculated;
- calculating a transportation cost for transporting the first high-usage device based on the calculated distance;
- determining that the transportation cost stays less than or equal to a predetermined transportation cost; and
- indicating the at least one high-usage device whose transportation cost stays less than or equal to the predetermined transportation cost and the second location.

6. The method according to claim 5, wherein determining the one or more pairs to relocate further includes
- calculating a cost of parts to be replaced until the first predetermined time is reached based on the current usage rate;
- calculating a cost of labor for replacing the parts until the first predetermined time is reached based on the current usage rate;
- calculating a cost reduction based on the usage data, calculated transportation cost, calculated parts cost, and calculated labor cost; and
- indicating the cost reduction at a second predetermined time.

7. The method according to claim 1, wherein determining the one or more pairs includes
- selecting one high-usage device from the at least one high-usage device determined to be the high-usage device; and
- selecting, from the determined at least one low-usage device, one low-usage device having the second difference within a predetermined range of the first difference of the selected one high-usage device to relocate and exchange with the selected one high-usage device.

8. The method according to claim 7, wherein the one high-usage device is selected based on the calculated first difference.

9. The method according to claim 1, wherein the target print count is determined based on durability of parts of the distributed devices.

10. The method according to claim 1, wherein the target print count is determined based on an average print count of the distributed devices that is expected after a second predetermined period of time.

11. A system for managing distributed devices, the system comprising:
- a retrieve unit for retrieving usage data from each of a plurality of distributed devices, wherein the usage data includes at least a total print count of the respective distributed devices over a period of time;
- a storage unit for storing the retrieved usage data;
- a calculation unit for calculating respective anticipated print counts of each of the distributed devices from respective device information of each of the distributed devices;
- a comparison unit for comparing the anticipated print count to a target print count, wherein if the anticipated print count exceeds the target print count, then a device is determined to be a high-usage device, and if the anticipated print count is below the target print count, then a device is determined to be a low-usage device;
- a determination unit for determining respective first differences between the anticipated print counts of each of one or more devices determined to be the high-usage device and the target count, and determining respective second differences between the anticipated print counts of each of one or more devices determined to be the low-usage device and the target count;
- a control unit for providing an instruction to identify, based on the first differences and the second differences, one or more pairs of the high-usage device and the low-usage device, and display the one or more pairs to relocate so that the anticipated print count of the each of the distributed devices stays within a predetermined range of a target print count.

* * * * *